May 28, 1968     J. GRILLO ETAL     3,386,025
REVERSIBLE POLARITY AC TO DC POWER SUPPLY
Filed Feb. 1, 1966     9 Sheets-Sheet 1

JOSEPH GRILLO
JOHN A. HERBST
INVENTORS

BY *George B. Tujirolk*

ATTORNEY

May 28, 1968     J. GRILLO ET AL     3,386,025
REVERSIBLE POLARITY AC TO DC POWER SUPPLY
Filed Feb. 1, 1966     9 Sheets-Sheet 2

JOSEPH GRILLO
JOHN A. HERBST
INVENTORS

BY George B. Oujevolk

ATTORNEY

May 28, 1968  J. GRILLO ETAL  3,386,025
REVERSIBLE POLARITY AC TO DC POWER SUPPLY
Filed Feb. 1, 1966  9 Sheets-Sheet 3

JOSEPH GRILLO
JOHN A. HERBST
INVENTORS

BY George B. Fujivolk

ATTORNEY

May 28, 1968    J. GRILLO ETAL    3,386,025
REVERSIBLE POLARITY AC TO DC POWER SUPPLY
Filed Feb. 1, 1966    9 Sheets-Sheet 5
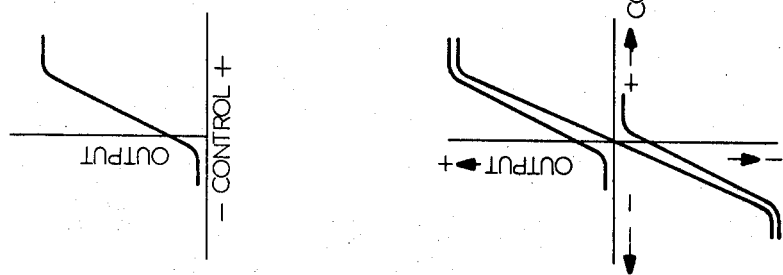
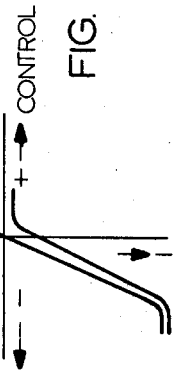
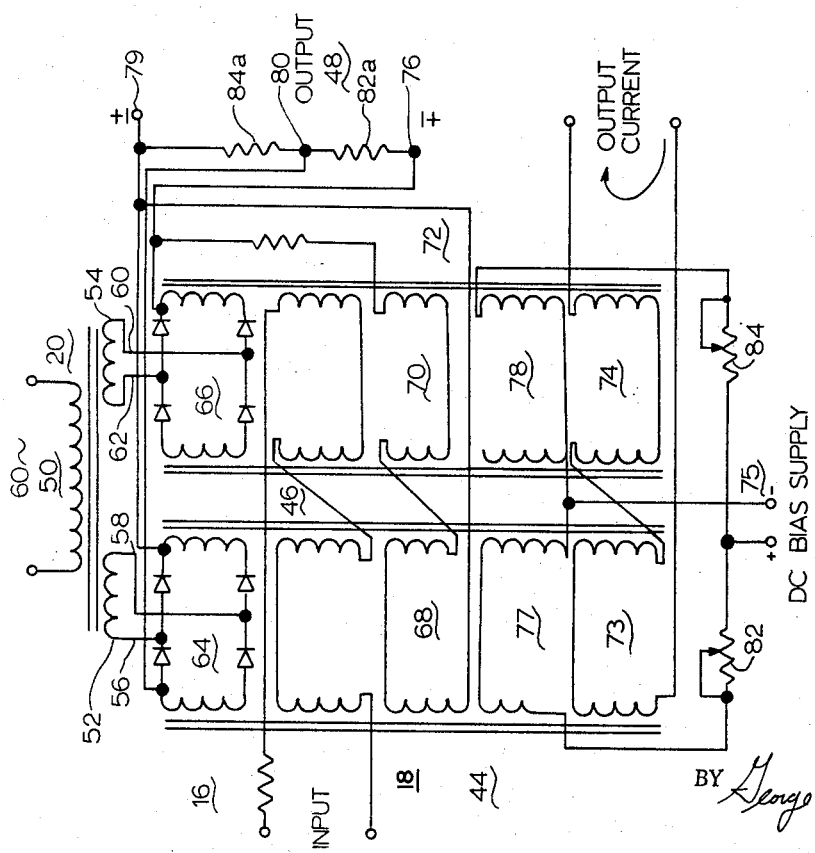
JOSEPH GRILLO
JOHN A. HERBST
INVENTORS
BY George B. Oujevolk
ATTORNEY

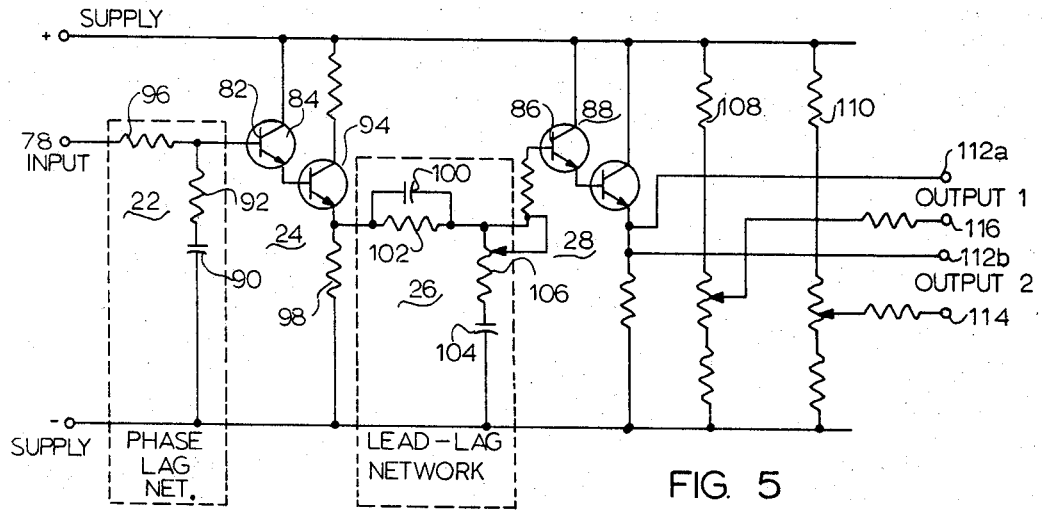
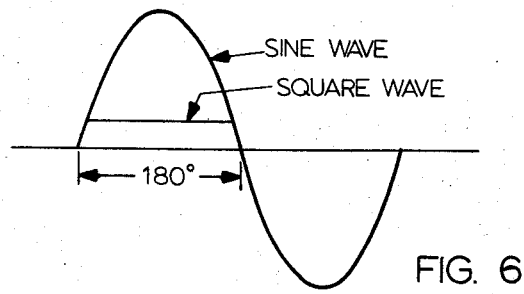
FIG. 6
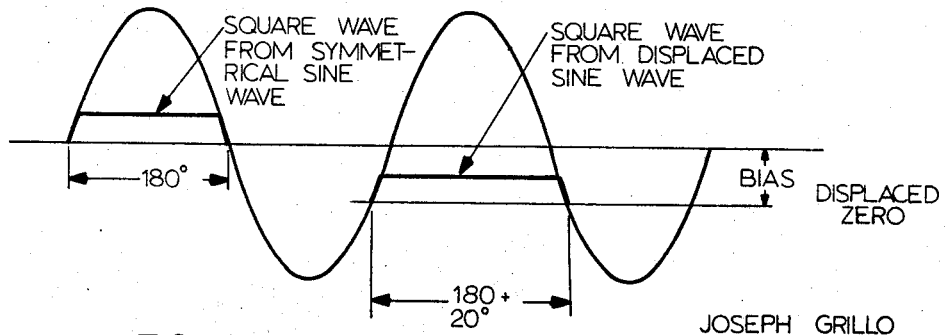
FIG. 7
JOSEPH GRILLO
JOHN A. HERBST
INVENTORS

JOSEPH GRILLO
JOHN A. HERBST
INVENTORS

BY George B. Gujevolk

ATTORNEY

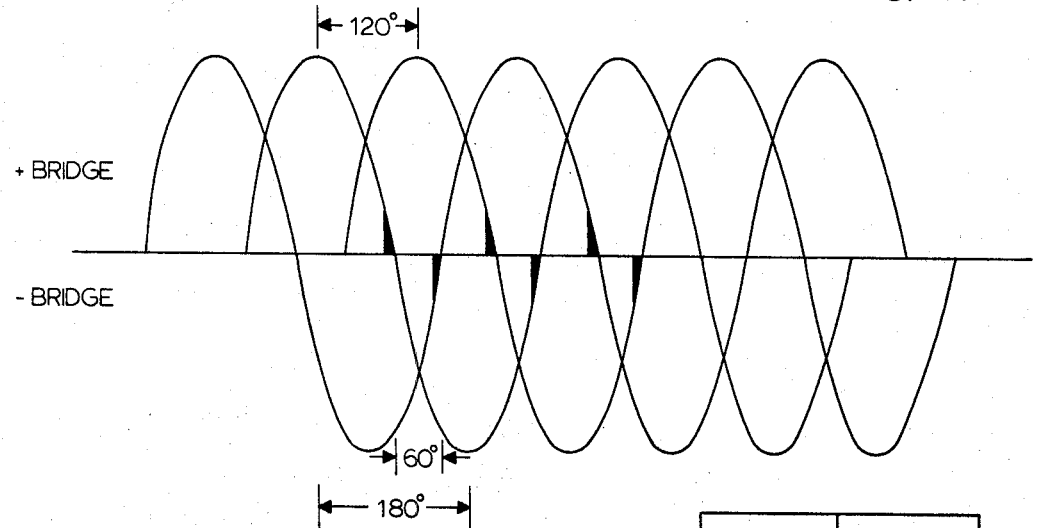
FIG. 11
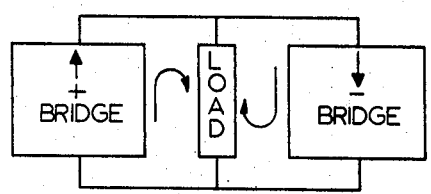
FIG. 11a
FIG. 12
Joseph Grillo
John A. Herbst
INVENTORS May 28, 1968 J. GRILLO ET AL 3,386,025
REVERSIBLE POLARITY AC TO DC POWER SUPPLY
Filed Feb. 1, 1966 9 Sheets-Sheet 9

JOSEPH GRILLO
JOHN A. HERBST
INVENTORS

BY George B. Oujevolk

ATTORNEY

United States Patent Office 3,386,025
Patented May 28, 1968

3,386,025
REVERSIBLE POLARITY AC TO DC POWER SUPPLY
Joseph Grillo, New Milford, and John A. Herbst, Boonton, N.J., assignors to General Precision Inc., Little Falls, N.J., a corporation of Delaware
Filed Feb. 1, 1966, Ser. No. 524,221
7 Claims. (Cl. 321—5)

ABSTRACT OF THE DISCLOSURE

A reversible AC to DC converter capable of supplying a reversible polarity DC output from a three-phase AC input from two silicon controlled rectifier bridges. Each bridge has three branches with a silicon controlled rectifier in each branch, the branches being respectively coupled to a three-phase input. The silicon controlled rectifiers are fired by magnetic amplifiers and square wave generators. The magnestic amplifiers have control windings which are responsive to the input stage. Thus, the input stage receives the input which determines the polarity of the output and controls this polarity by acting on the control windings of the magnetic amplifiers which in turn determines the firing of the silicon controlled rectifiers.

---

The present invention relates to AC to DC rectifiers, and more particularly to the production of reversible-polarity, current-regulated, DC power from a three-phase AC supply source using solid state components throughout and controlling the output by silicon controlled rectifiers often referred to in the industry as SCR's.

The system contemplated employs negative feedback and regulates output current from zero to maximum, plus or minus, as a linear function of the input. The system can be used to regulate output voltage instead of current with a minor modification of the main feedback connection.

The invention, as well as the objects and advantages thereof, will be better understood from the following detailed description when taken in conjunction with the accompanying drawings in which:

FIG. 1 presents the circuit contemplated in the form of a block diagram;

FIGS. 1a to 1c when taken together form a schematic layout drawing of the circuitry of the block diagram shown in FIG. 1;

FIG. 2 is an enlarged schematic view of a signal input section corresponding generally to a portion of the circuitry in part of FIG. 1a but varied somewhat therefrom for the purpose of practical explanation;

FIG. 3 graphically depicts the operating characteristics of one-half of the bridge connected magnetic amplifier in the input section of FIG. 2, whereas, FIG. 4, likewise, depicts graphically the composite effect of the two halves of the bridge in the input section of FIG. 2;

FIG. 5 provides another schematic explanation of circuitry roughly corresponding to the second stage shown in FIG. 1, and circuitry shown in part of FIG. 1a. This circuitry has also been varied from that shown in FIG. 1a for the purpose of practical explanation;

FIG. 6 shows how a partial square wave is made by cutting off the top portion of a sine wave;

FIG. 7 shows how the width of the square wave is extended to greater than 180° by the addition of a DC bias;

FIG. 8 illustrates in simplified schematic form the generation of the wave form of FIG. 6, whereas.

FIG. 11a shows in block diagram the results of the firing sequence presented in FIG. 11;

FIG. 12 is a schematic diagram of a silicon controlled rectifier bridge circuit herein contemplated which generally corresponds to similar circuitry shown in FIG. 1c but has been varied for the purpose of practical explanation;

Figure 13:
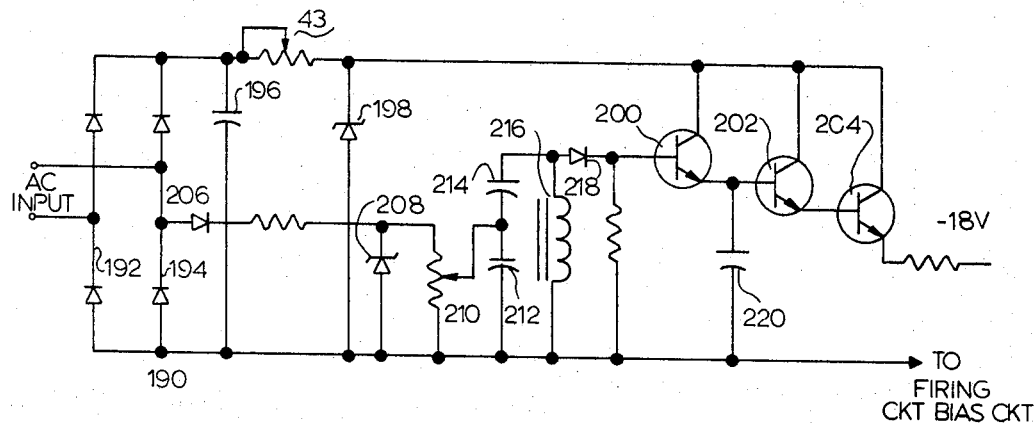
Figure 14:
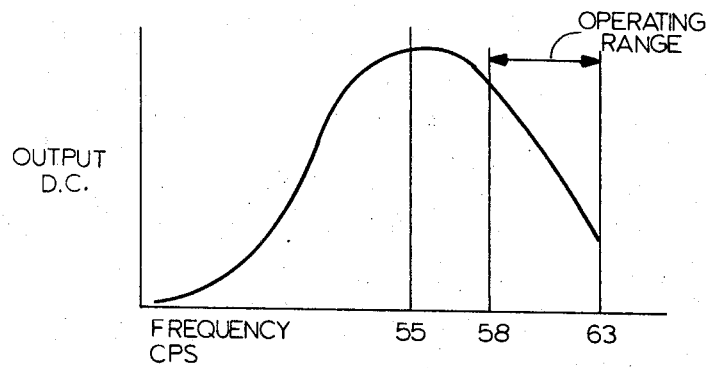

FIG. 13 provides in schematic form a frequency compensation circuit for the silicon controlled rectifier bridge circuit of FIG. 12; and FIG. 14 graphically shows the action of the frequency compensation circuit of FIG. 13.

General description

Generally speaking, the apparatus 10 contemplated herein is for providing a reversible polarity DC output 12 from a three-phase AC supply source 14 in response to an input signal 16 which can be a small DC current.

The input signal 16 is fed to the input stage 18 powered by a single-phase AC source 20. The input stage 18 has a set of magnetic amplifiers in push-pull. The output of the input stage drives a stabilizing stage with emitter-follower transistor amplifier stages and corrective networks 22, 24, 26 and 28. The output from these networks is in turn supplied to the magnetic amplifier firing circuits 30 and 32 which will be used to fire the silicon controlled rectifier bridge circuits 34 and 36. Thus, the original small input signal 16 has been amplified by the push-pull magnetic amplifier input stage, stabilized and corrected in the transistor amplifier and corrective network stages and used as the control signal of the firing circuits which will fire the bridge circuits. There are two full wave bridge circuits 34 and 36 which rectify the outputs of three-phase power supply 14; one for positive and one for negative polarity. These bridges connect to a common filter stage 38 used for ripple suppression in the load current. Also fed to the firing circuit is a square wave supplied by square wave generator 40. The reason for square wave generator 40 will become more apparent as the description proceeds. Negative feedback 42 is employed to improve the linearity and response time.

Changes in frequency of the three-phase power supply are compensated for by a frequency variation compensation circuit 43 connected to the magnetic amplifier firing circuits 30, 32.

Figure 1:
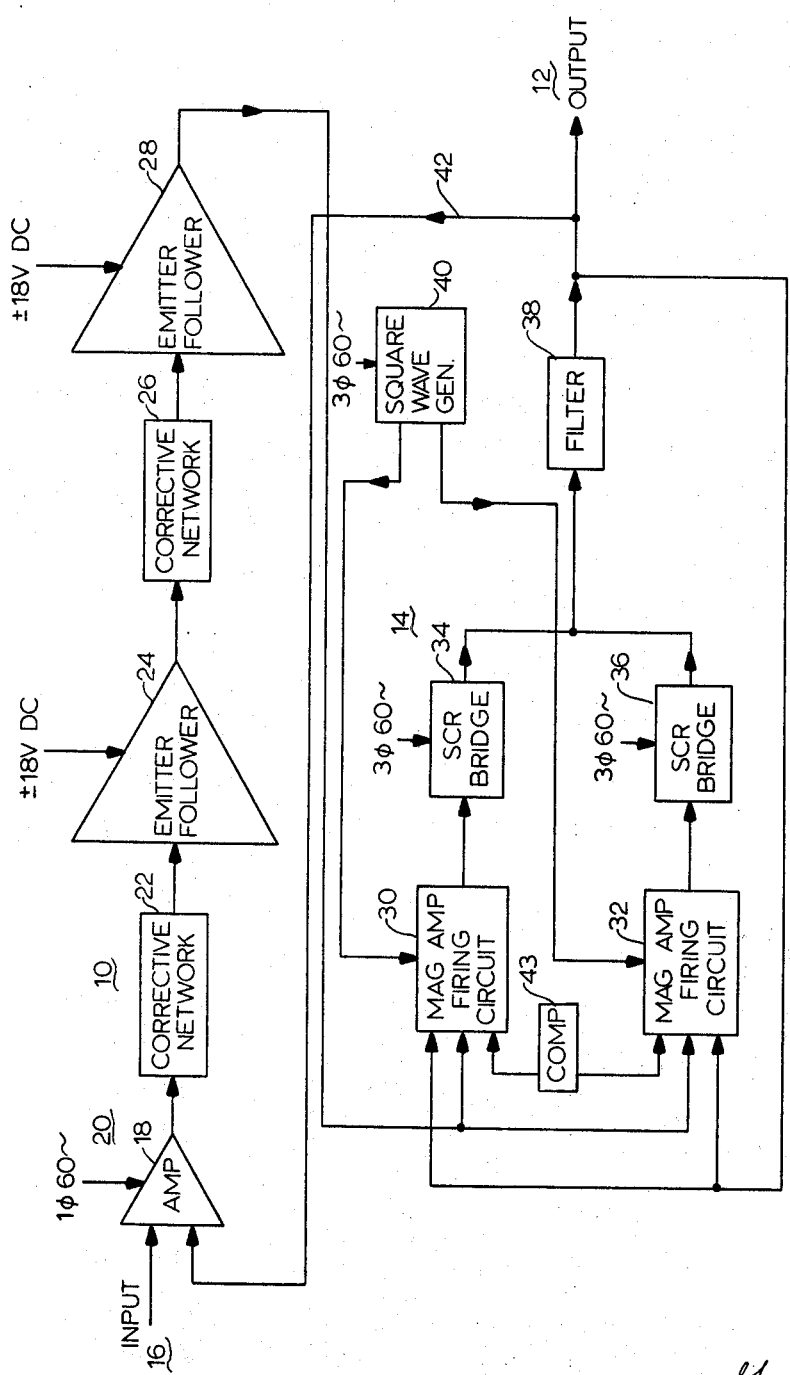
Figure 1A:
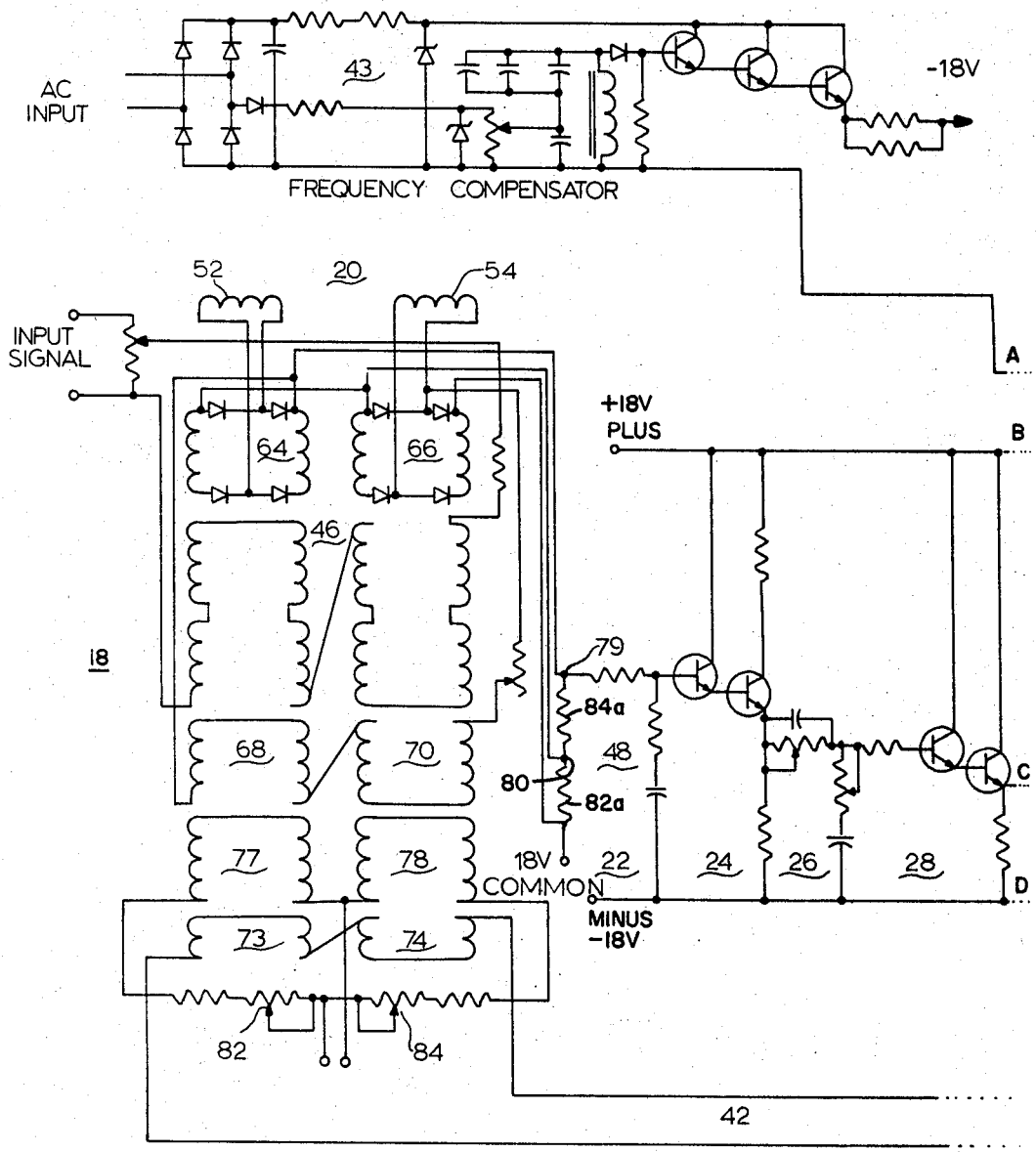
Figure 1B:
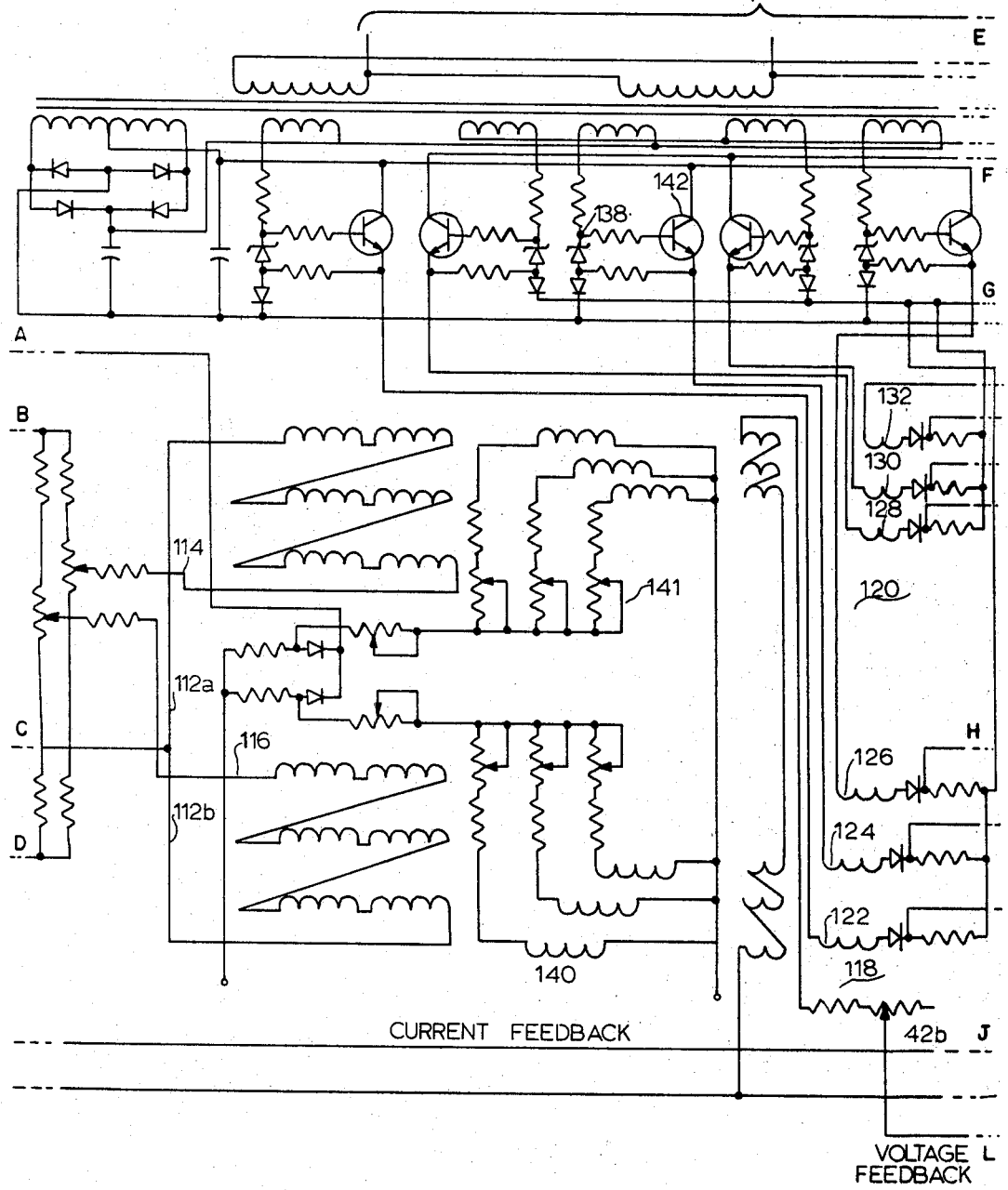
Figure 1C:
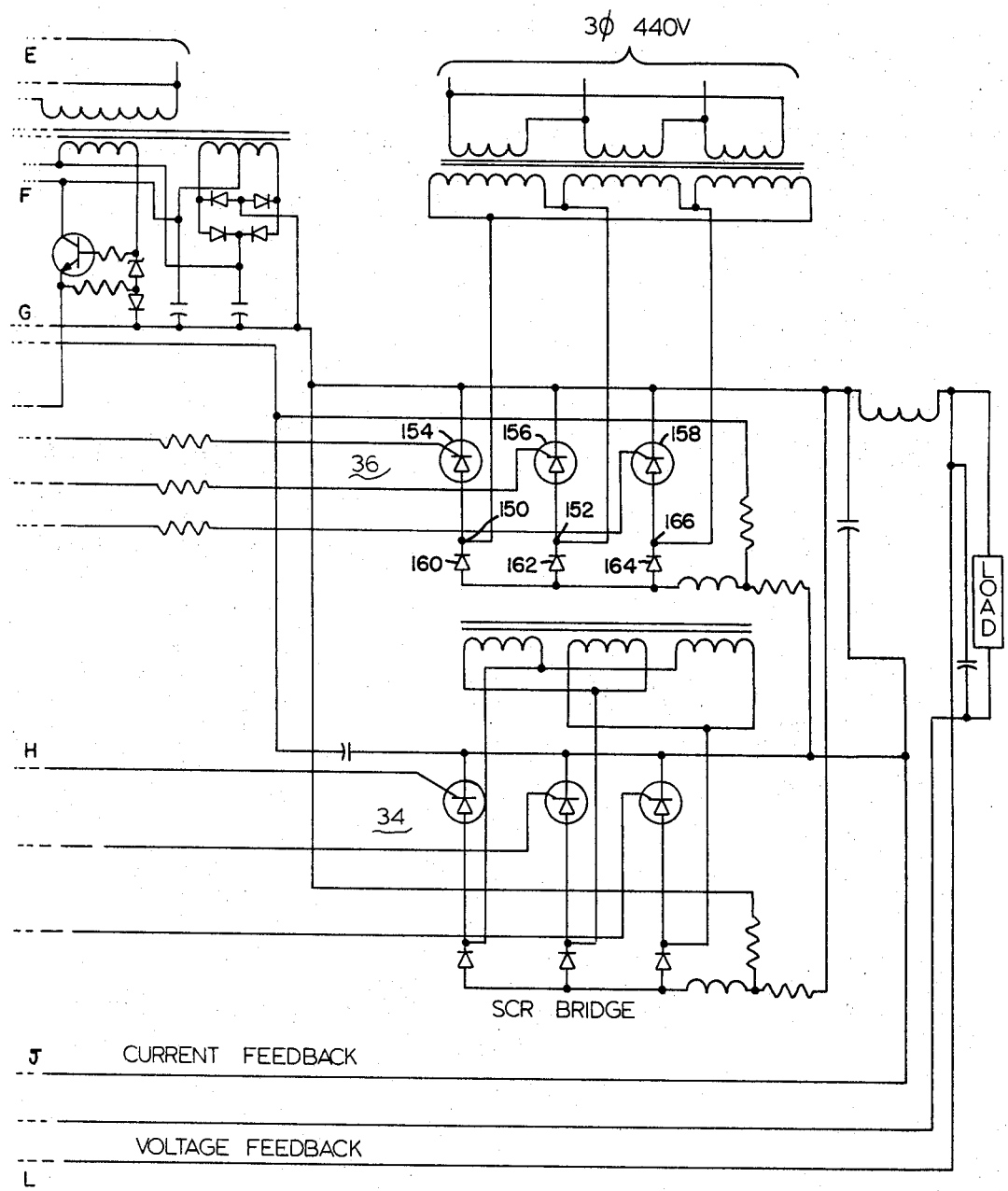

Since the circuitry described herein is somewhat complex, the entire system is first shown in an extended schematic drawing, in FIGS. 1a to 1c. Then, individual components used in the systems are described and shown separately. For ease in explanation, some of the individual components shown do not correspond precisely with the extended schematic represented in FIGS. 1a to 1c. The letters A through N, appearing along the sides of FIGS.

1a through 1c are merely to assist the reader in recognizing corresponding lines in these three figures.

Signal input stage

The signal input stage 18, having a first stage magnetic amplifier section 44, consists of two single phase full wave bridge magnetic amplifiers 46 connected in push-pull so that the output 48 is reversible polarity DC. FIG. 3 shows the operating characteristics of each half and FIG. 4 shows the composite of the two halves in push-pull. The input stage is powered from AC source 20 across a transformer primary 50 to two transformer secondaries 52 and 54; the lead lines of each secondary 56, 58 and 60, 62 are each connected to the center points of one leg of diode rectifier bridges 64 and 66. The output of magnetic amplifier 44 is fed back to windings 68 and 70 from the output 48 in local feedback loop 72. The final output 12 is, likewise, fed back to the input stage 18 across final feedback loop 42 to windings 73 and 74, likewise coupled to magnetic amplifiers 44. The zero point of the first stage is adjusted by a DC bias supply 75 coupled to the magnetic amplifiers 44 and 46 by center tapped windings 77, 78 and adjusted by means of series potentiometers 82, 84.

Accordingly, input signal 16 is supplied to opposite sides of magnetic amplifiers 44 and 46 which are regulated by local and final feedback loops and a DC bias supply. The magnetic amplifiers are connected to load resistors 82a and 84a, and the negative output terminal of each magnetic amplifier is connected to common point 80. The outputs of the two magnetic amplifiers are connected in opposition such that on a positive input, signal point 79 will be positive with respect to point 76 and on a negative input signal point 76 will be positive with respect to point 79. This results in push-pull operation. Accordingly two identical output characteristics are shown in FIG. 3 and will provide the push-pull output described, as shown in FIG. 4.

Stabilizing stage

The output 48 of the first stage is amplified in two emitter-follower transistor stages 24 and 28. These stages include two compensation networks 22 and 26 which alter the frequency and phase characteristics of the system to insure stability of the overall amplifier within the required accuracy and pass band limits. Thus, output 48 is fed across a phase lag network, i.e., corrective network 22 having a capacitor 90 and resistors 92 and 96 across the lead line 78 and the negative supply voltage. This phase lag network in turn controls first emitter-follower stage feeding into base 82 of a pair of NPN transistors 84, 94 in a Darlington connection. This first emitter-follower stage 24 is followed by lead-lag network, i.e., compensation network 26 consisting of a lead portion, i.e., capacitor 100 and resistor 102 and, a lag portion, i.e., capacitor 104 and resistor 106. Lead-lag network acts on the base 86 of second emitter-follower stage 28, likewise consisting of a pair of transistors 86 and 88. The output of the emitter-follower appears across the emitter-resistor of transistor 88.

The output from the emitter section of second emitter-follower stage 88 is supplied by two leads 112a and 112b and the operating levels are provided by taps 114 and 116 from the parallel resistor branches 108 and 110. The general purpose of the corrective networks 22 and 26 and the emitter-follower stages 24 and 28 is to stabilize the system and the outputs of the last emitter-follower stages across leads 112a, 116 and 112b, 114 are fed to magnetic amplifier fiing circuits 32 and 36 which fire the silicon controlled rectifiers.

Magnetic amplifier firing circuits

There are two sets of magnetic amplifier firing circuits, one for each output polarity 118 and 120. The two firing circuits 118 and 120 (see FIGS. 1a to 1c) are essentially in parallel and means are provided for adjusting each component individually.

Figure 9:
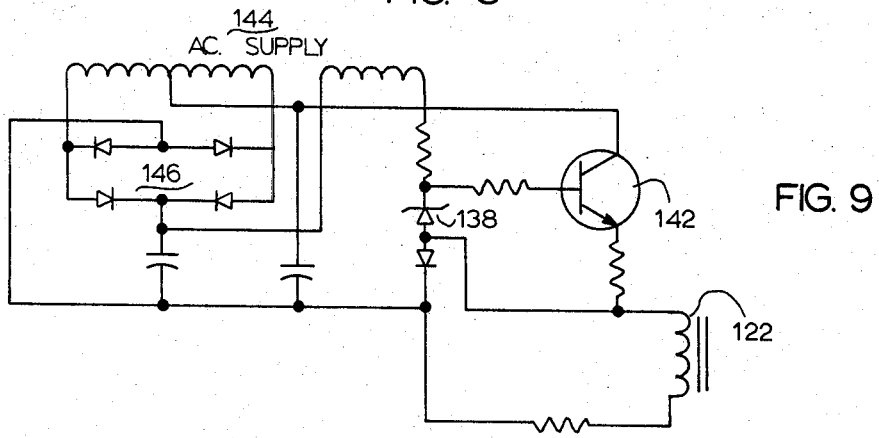
FIG. 9 shows in schematic form the arrangement used in practice which can be coupled to the rest of the circuitry shown.
Figure 10:
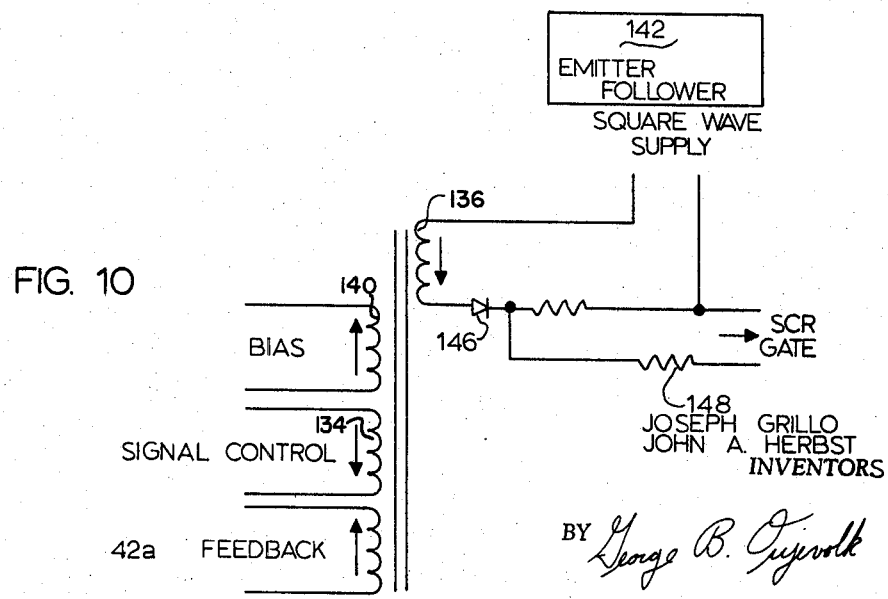
FIG. 10 is a schematic view of one of the firing circuits required in connection with the present invention; while, FIG. 11 sinusoidally presents the firing sequence of the positive and negative silicon controlled rectifier bridges required to produce a reversible polarity in the output.

Each magnetic amplifier circuit 122, 124, 126, 128, 130, 132 (see FIGS. 1a to 1c) is made up of a single-phase half-wave configuration, each unit controlling a single silicon controlled rectifier. Hence, 6 single-phase magnetic amplifier units are used in the system, portions of one of which is shown in FIGS. 8, 9 and 10.

These single-phase circuits trigger the silicon controlled rectifiers at the instant the amplifier changes from its non-conductive state, usually termed the firing point of the magnetic amplifier. This point is determined by two values, the current in the control winding 134 and the volt seconds applied to the power winding 136. If the voltage is maintained at a constant level such as a square wave, the firing time will vary linearly with the control current.

For this reason, and the matter of smooth control to zero, hereinafter described, the amplifiers are powered from a square wave source.

Figure 8:
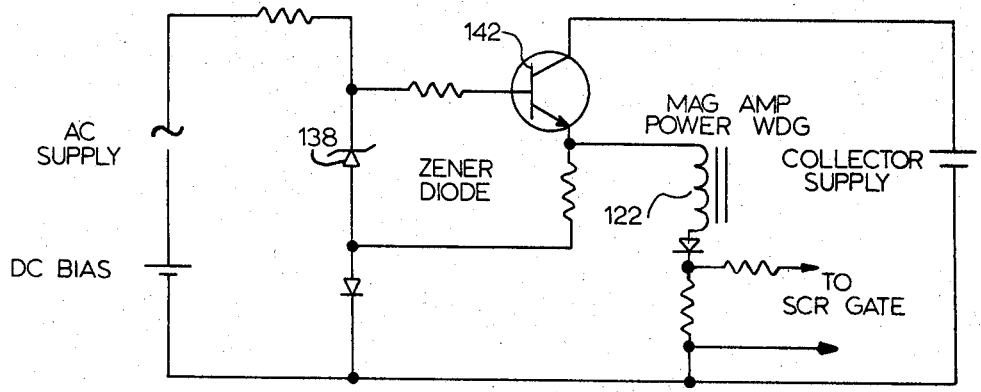

The type of square wave generator circuit required is shown in FIG. 8. The square wave is generated by clipping a sine wave with a zener diode 138 (since each mag-amp is half wave, we are interested in only half of a square wave). This is shown in FIG. 6.

It is desirable to have the firing circuit overlap the anode silicon controlled rectifier circuit wave so that smooth control can be obtained at zero output. This can be achieved by displacing the original sine wave by means of a bias. The effect of this bias shown in FIG. 7 serves to displace the zero or null point. Bias is accomplished by means of a rectified voltage supplied by rectifier 146.

The square wave is generated at a low power level and is then amplified by an emitter-follower amplifier stage 142. This is shown in simplified form using batteries for DC supplies in FIG. 8, and as actually used in the system in FIG. 9 wherein the AC supply 144 is fed across a rectifier means 146 and zener diode 138.

The connections for a single magnetic amplifier firing circuit are shown in FIG. 10. In FIG. 10, the magnetic amplifier winding 136 is receiving a square wave supply from emitter-follower stage 142. The signal from the previous stages is fed to control winding 134. The bias required to set the proper operating level is supplied by winding 140 and, as shown in FIGS. 1A to 1C, bias for each magnetic amplifier is supplied by resistors or potentiometers, e.g., resistor 141.

Each magnetic amplifier winding 136 controls the firing across a diode 146 and resistor 148 to a silicon controlled rectifier in one of the rectifier bridges 34, 36, wherein three branches of silicon controlled rectifiers 154, 156, 158 and three complementary diodes 160, 162, 164 are connected in a three-phase full wave bridge configuration. The AC input is fed to the center point of each branch 150, 152, 166 and two of these bridges make up the power output stage of the system. One bridge provides plus output and the other provides minus output. The two bridges are phased so that one conducts on the plus half cycle of the input supply voltage and the other conducts on the negative half cycle. This means that there is 180° phase displacement between a silicon controlled rectifier in one bridge and the corresponding silicon controlled rectifier in the other bridge. Since these are three phases displaced by 120°, the phase displacement between a pulse from one bridge and the next pulse from the other bridge is (180°−120°) or 60°. These phase relationships are shown in FIG. 11. (A complete mathematical treatment of a similar arrangement will be found in an article by Abraham Lavi et al. "Static Amplydine; A New High-Capacity Push-Pull Power Amplifier" AIEE September 1963, pages 503–508.)

In order to get a good transition from one bridge to the other as the output goes through zero, it is desirable to have a finite current from each bridge. This is, in reality, an overlap current and in this type of system the overlap current should range from 1%–5% of rated output.

When the average value of the (+) pulses equals the average value of the (−) pulses, there is zero output in the load. It can be seen that since there is 60° displacement between (+) and (−) pulses, the two bridges do not conduct at the same time and there is no current flow between them.

As output increases, the pulses on one side get larger, and on the other side get smaller until they disappear entirely.

The firing of each bridge is shown in the block diagram of FIG. 11a.

The three-phase power supply is fed to the midpoint of each silicon controlled rectifier and its associated diode, e.g., to mid-point 166 between silicon controlled rectifier 154 and diode 160. Each silicon controlled rectifier is controlled by a square wave, e.g., supply across diode 146 and resistor 148.

*Output filter*

The output of each silicon controlled rectifier bridge is connected to a resistor 168, 170 which is in series with the load. The voltage drop across each resistor (when its associated bridge is conducting) is filtered by resistor and capacitor filters 172, 174 and 176, 178 and is supplied as a negative bias on the silicon controlled rectifiers of the non-conducting bridge in order to minimize the tendency towards crossfiring (both bridges firing at the same time).

The output of the bridges is further filtered by a series reactor 180 or 182 and capacitors 184, 186 and reactor 188. The output load appears across capacitor 186. Feedback between the load current and the input is applied to windings 72, 74 on the input stage magnetic amplifier which is in series with the load. Feedback is also employed between the output and the firing circuit magnetic amplifiers by lines 42a and 42b.

*Frequency variation compensation*

The circuit arrangement hereinbefore described is designed to operate from a three-phase, sixty cycle, AC power supply. But, the actual frequency supplied from the power line varies in practice from about 58 to about 63 cycles.

Since magnetic amplifiers are sensitive to frequency, the firing circuit magnetic amplifiers will shift their operating point and cause the firing angle of the silicon controlled rectifiers to shift when there is a change in frequency. When the power amplifier is operating at a level other than zero, the automatic regulating feature of the system will compensate for a shift in operating point due to frequency change and maintain the output at the required level.

When the system is operating at zero output current, each silicon controlled rectifier bridge 34, 36 provides a finite overlap current in the order of 50 to 200 milliamperes and the net output is zero. A change in frequency will ultimately cause the overlap current at zero to increase and possibly cause a crossfire between the two bridges.

The circuit for frequency variation compensation 43 in FIG. 13 is a means for maintaining the overlap current within the desired range as the input frequency changes. This is accomplished by changing the bias on the firing circuit magnetic amplifiers (See FIG. 10).

The AC input is rectified by bridge rectifier 190 consisting of two branches 192, and 194, each with two rectifiers filtered by capacitor 196 and the DC output from bridge 190 is regulated by zener diode 198. The resulting DC is the collector supply for transistors 200, 202, 204 which are hereinafter described.

The input AC is also half wave rectified by diode 206 and made into a square wave by zener diode 208. The amplitude of the square wave is adjusted by potentiometer 210 and is then partially filtered by capacitor 212. The resulting wave is applied to a resonant at approximately 55 cycles per second. The voltage occurs across inductor 216 and decreases with an increase in frequency. This is rectified by diode 218 and applied to transistor 200. This output is filtered by capacitor 220 and applied to a Darlington consisting of transistors 202 and 204. Hence, a DC output is produced which varies with frequency. As the frequency is increased, the DC output of the frequency compensation circuit decreases, as shown in FIG. 14.

The output of the frequency compensation circuit is connected into the bias circuit of the firing circuit magnetic amplifier in a counterflow direction to buck the bias and maintain essentially constant overlap current as zero output when the frequency changes.

While the present invention has been described in a preferred embodiment, it will be obvious to those skilled in the art that various modifications can be made therein within the scope of the invention, and it is intended that the appended claims cover all such modifications.

What is claimed is:

1. In a reversible polarity, three-phase AC to DC converter having first and second silicon controlled rectifier bridges, each bridge having three branches with at least one silicon controlled rectifier in each branch including means for coupling each branch to a three-phase input, said bridges supplying alternating positive and negative half waves of output current; a magnetic amplifier firing circuit having magnetic amplifiers connected to and controlling the firing of each silicon controlled rectifier; a square wave generator for generating square waves and bias means, the square wave supplying a voltage to the magnetic amplifier firing circuit, the bias means in the square wave generator extending the width of the generated square wave so that there is an overlap in the firing voltage supplied to the silicon controlled rectifier; and, an input stage for receiving an input of a positive or negative polarity and providing a corresponding output, a magnetic amplifier control winding receiving said corresponding output and controlling said magnetic amplifiers of the firing circuit; the improvement therein, wherein said input stage comprises a magnetic amplifier having two windings in push-pull, receiving said input of positive or negative polarity and including an AC input receiving transformer, rectifier bridge means responsive to the push-pull windings receiving the AC input across said input receiving transformer and providing a rectified DC output, bias means for adjusting the output of the magnetic amplifier windings, and feedback means including windings to stabilize said input stage.

2. A converter as claimed in claim 1, said input stage supplying DC output to a stabilizing stage including a phase lag and lead-lag network, and, a control winding in each of said magnetic amplifier firing circuits, said networks supplying a control signal to said control windings.

3. A converter as claimed in claim 2, said magnetic amplifier firing circuits including bias means having a bias winding and resistors, and, a feedback winding connected to the output stage.

4. A converter as claimed in claim 3, said silicon controlled rectifier bridges having one silicon controlled rectifier and one diode in each branch, the diodes and silicon controlled rectifiers in each bridge being disposed for providing opposite polarity DC current, the three phase input power being fed to the centerpoint of each branch between the diode and silicon controlled rectifier therein.

5. A converter as claimed in claim 4, including frequency variation compensation means connected to said magnetic amplifier firing circuit.

6. A converter as claimed in claim 5, including a second square wave generator, a resonant circuit, resonant at about the desired frequency having an inductance coil therein so disposed that the voltage drop across the coil varies inversely with the frequency, means for rectifying said voltage and means for applying said rectified voltage in counter-flow direction to said magnetic amplifier bias windings.

7. A converter as claimed in claim 6, including resistance and filter means in series with the DC current supply side of each one of said first and second silicon controlled rectifier bridges acting on the other of said bridges to supply negative bias on the silicon controlled rectifiers in the branches of the non-conducting bridge to minimize the cross-firing.

References Cited
UNITED STATES PATENTS

| | | | |
|---|---|---|---|
| 3,071,720 | 1/1963 | Geissing | 321—18 |
| 3,210,639 | 10/1965 | Stringer et al. | 321—18 |
| 3,297,937 | 1/1967 | Benchimol | 321—60 |
| 3,315,143 | 4/1967 | Lawrence et al. | 321—7 |
| 3,320,514 | 5/1967 | Lawrence | 321—45 |
| 3,337,788 | 8/1967 | Pelly | 307—88.5 XR |

LEE T. HIX, *Primary Examiner.*

WARREN E. RAY, *Examiner.*

W. M. SHOOP, *Assistant Examiner.*